May 9, 1933.    R. L. HEEREN ET AL    1,908,241
SEALING DEVICE
Filed May 16, 1932
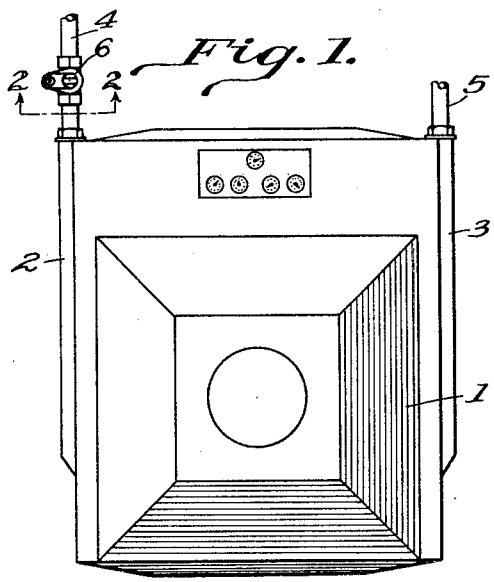
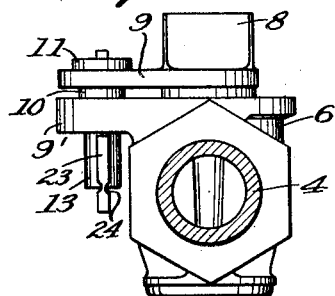
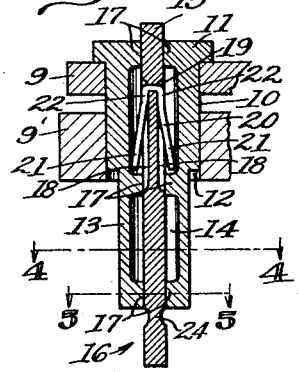
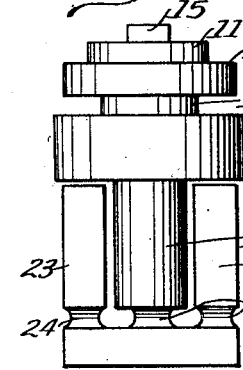
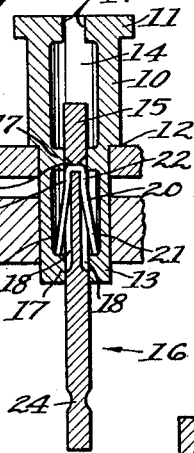
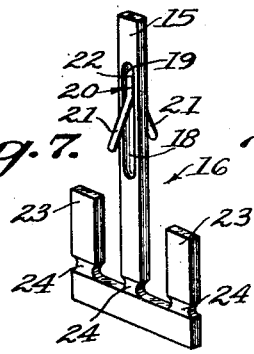
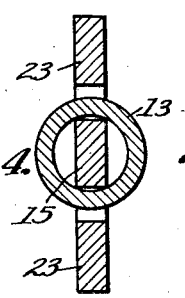
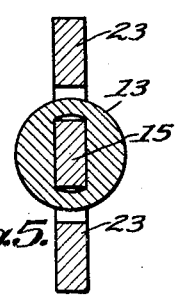
Inventors
R.L.Heeren
C.W.Stevens
By
W. S. McDowell
Attorney Patented May 9, 1933

1,908,241

UNITED STATES PATENT OFFICE

REINHARD L. HEEREN, OF BROOKLYN, NEW YORK, AND CHARLES W. STEVENS, OF COLUMBUS, OHIO

SEALING DEVICE

Application filed May 16, 1932. Serial No. 611,508.

This invention relates to protective sealing devices for valves, pipe couplings and the like and especially to sealing devices for shut off valves employed in connection with gas, water and other meters for controlling the flow of fluid therethrough and associated supply lines.

In meter installations, it is customary to position a shut off valve at or near the inlet to the meter so that the fluid flow through the meter may be stopped when service is to be discontinued or repairs made to parts of the service line. These shut off valves are usually of the rotatable plug type of which some are known in the trade as stopcocks and in certain construction of these cocks the plugs thereof are each provided at one of their ends with a lateral extension or wing. This extension or wing is formed with an opening which, when the plug is in a fluid arresting position, registers with a similar opening formed in a corresponding wing carried by the valve body and through which registered openings a key operated padlock, seal padlock, locking pin or other type of sealing device may be positioned to lock the valve against the passage of fluid therethrough and prevent the opening of the valve without breaking or damaging the sealing device.

Certain of these devices are formed to include a pair of complementary sections held together in a sealing position by spring lock securing means of a fragile nature. An outstanding objection to certain constructions employed by prior sealing devices is that they include too many parts which complicate the manufacture thereof and add to the cost of the device. Further, a large number of parts makes it difficult to assemble the device for operation and to keep the parts thereof in proper working relation with one another.

It is an object of the present invention to overcome these and other objections by providing a sealing device for the uses set forth which is extremely simple yet efficient in its construction, comprising only two major parts of which one is in the shape of an elongated barrel or hollow cylindrical member and the other a spring locking securing key, the latter being telescopically positioned within said cylindrical member.

Another object of the invention is to provide a novel spring mounting in connection with the locking key which is extremely simple, reliable in its operation and one which is of such nature as not to cause the spring to become bent or distorted when a pulling action is exerted upon the key.

A further object is to provide a sealing device of this character which may be adapted to fit in various sized openings provided for the barrel of the sealing device, and further to lock the securing key associated therewith at various points longitudinally of the barrel thereby providing a single sealing device capable of conforming to a plurality of conditions.

For a further understanding of the invention, reference is to be had to the following description and the accompanying drawing wherein similar characters of reference denote like and corresponding parts throughout the several views thereof and in which:

Fig. 1 is an elevation of a conventional type of gas meter with an embodiment of our invention applied to the shut off valve positioned in the inlet line to the meter;

Fig. 2 is a horizontal sectional view on an enlarged scale taken on the line 2—2 of Fig. 1;

Fig. 3 is a longitudinal sectional view taken through the sealing device;

Fig. 4 is a transverse sectional view taken on the line 4—4 of Fig. 3;

Fig. 5 is a similar view taken on the line 5—5 of Fig. 3;

Fig. 6 is a longitudinal sectional view taken through the sealing device showing the same in a slightly different installation;

Fig. 7 is a perspective view of the frangible key member forming a part of the device;

Fig. 8 is a side elevation of the sealing device.

Referring more particularly to the drawing, the numeral 1 designates a conventional gas meter having the usual vertical intake passage 2 at the left side thereof and the outlet passage 3 at the opposite or right side of the meter. Connected to the upper end of the passages 2 and 3 are pipes 4 and 5 of which the pipe 4 has positioned therein, at a distance above the meter, a shut off valve or stop cock 6. This shut off valve is of the usual construction including a casing in which is positioned a rotatable plug member for controlling a port extending through the casing and which plug member may be rotated by a wrench or other suitable tool applied to the extension 8 thereof. In certain instances valves of this type are each provided with a lateral extension or wing 9 formed with the plug body and rotatable therewith and which when the valve is in a closed position to arrest fluid flow therethrough aligns with a similar extension or wing 9' cast integrally with the valve body. Formed in these wings are registering openings through which hitherto a padlock or other locking device has been positioned to hold the valve in its closed position to prevent opening thereof by an unauthorized person.

To take the place of padlocks and other devices which are objectionable for various reasons, we provide a cylindrical member designated by the numeral 10 which is of an elongated form and provided with a shouldered head or enlargement 11 at one end. The member 10, which is positioned within the registering openings formed in the wings 9 and 9', is of such diameter or cross sectional formation as to have a comparatively snug fit therein with the head 11 forming a shoulder and engaging the outer surface of the wing 9. The member 10 is also shouldered substantially half way of its length as at 12 to provide a reduced lower portion 13 adapted to fit openings of smaller diameter formed in the wing extensions as disclosed in Fig. 6 of the drawing, opening of both sizes being commonly found in practice.

Formed longitudinally and centrally of the cylindrical member 10 is an open ended bore 14 for the reception of an elongated shank 15 formed upon a key member 16. The bore 14, which is substantially cylindrical in cross section, has provided therein at each end and also at a position substantially midway of its length with transversely arranged pairs of shoulders 17. The shoulders are arranged oppositely to one another and relatively spaced to provide restricted passages of substantially rectangular cross sectional outline to form a comparatively snug fit for the similarly shaped shank of the locking key 16. By means of the rectangularly shaped passages provided by the shoulders 17, the key and the cylindrical receiving member therefor will be locked against rotation with respect to one another and yet permit the ready insertion of the key shank within the bore which will thus be positioned centrally of the bore and slightly spaced from the side walls thereof.

To secure the key member 16 in locking relationship with the cylindrical member 10, the shank 15 of the key is provided on two of its opposed sides with comparatively shallow longitudinally extending grooves 18 having an opening 19 arranged at one of their ends and extending through the shank of the key. Extending through the opening is a substantially V-shaped wire spring 20 having its arms 21 thereof arranged longitudinally of the grooves 18. The spring 20 which is so positioned as to have its vertex located within the opening 19 has the portions 22 of the spring arms adjacent the vertex bent or pinched inwardly to lie parallel with the bottom of the grooves. This pinching of the spring at this point will retain the same in longitudinal alignment with the shank of the key and prevent sideward or rotary swinging action thereof within its attaching opening.

The grooves 18 formed in the shank 15 are of such length and depth as to receive the arms of the spring, which are forced inwardly during the insertion of the key shank within the bore of the member 10 and while passing the shoulders 17. The arms of the spring member will, of course, due to the resiliency thereof, again spread apart into engagement with the side wall of the bore within the member 10 and snap behind the shoulder portions 17 when the free ends of the spring arms have been moved to a point clearing the shoulders. This will lock the key in place within the member 10 and prevent its withdrawal therefrom and as the outer end of the key is provided with laterally spaced stop members 23, which engage with the outer surface of the wing extension 9' of the valve body, the key is also prevented from being pushed through the bore of the receiving member 10. It will be noticed that due to the provision of the several spaced locking shoulders within the member 10, the key member may be pushed inwardly into locking engagement with said member so that the stops 23 will engage with the wing 9' whether the enlarged or reduced portion of the cylindrical member 10 is positioned within the openings of the cooperating wing extensions. This is an important feature in that the cylindrical member may thus be locked in place within the opening of the wing extensions in both of its positions without allowing end play thereof and thereby prevent any possible turning movement of the plug member within the valve to allow for any passage of fluid therethrough. Another important feature of the device resides in forming the key shank 15 to be slightly greater in length than the member 10 so that when the key member is broken at the weakened portion 24, the shank may be readily disengaged by applying a pair of pliers or other tool to the opposite end of the shank and pulling the same through and free from the member 10.

In operation, it will be seen that when it is desired to seal the stop cock or shut off valve in its closed position, the cylindrical member or barrel 10 is inserted through the registering openings formed in the aligned wings of the plug and valve body respectively until either of the exterior shoulders provided upon the barrel member engage with one of the wing members. The locking key is then inserted through the reduced end of the barrel member, to the fullest extent, until the spring member carried by the key will snap behind the shoulders within the barrel member thereby locking the sealing device in place within its associated wing extensions and preventing its removal therefrom without breaking or damaging the same. It will be understood that the barrel or cylindrical member 10 may be used over and over whereas the key member when once broken is useless and must be replaced by another.

From the foregoing, it will be seen that a sealing device has been provided which is extremely simple yet effective in its construction, comprising a single cylindrical tubular member provided with a head at one end and used on the order of a locking bolt with a key inserted in the end opposite to that of the head for locking a pair of relatively movable parts between said head and key. Although the device has been shown and described as in its preferred use in connection with the sealing of a stop cock or shut off valve for gas or water meters, it will be understood that the device has a greater field of use and may be employed wherever a seal of this kind is desired.

What is claimed is:

1. A sealing device comprising a tubular member provided with longitudinally spaced external shoulders, longitudinally spaced internal shoulders provided within the bore of said member, a locking key provided with a shank receivable within said bore, spring means carried by said shank for selective engagement with said internal shoulders whereby to retain said key in secured engagement with said tubular member, and a frangible locking head provided upon the outer end of said key and projecting laterally beyond the boundaries of the tubular member.

2. A sealing device comprising an elongated cylindrical member having a shouldered enlargement at one end, the other end portion of said member being reduced in diameter and formed to provide a shoulder substantially midway of its length, said member being provided with an open ended bore restricted at its end to form shoulders, similar shoulders arranged substantially midway within said bore, a locking key provided with a shank receivable within said bore, spring means carried by said shank for selective engagement with said internal shoulders to retain the key in place in secured engagement with said cylindrical member, a frangible head provided upon the outer end of said key and projecting laterally beyond the boundaries of said member, and spaced stops formed with the outer ends of said head and extending upwardly therefrom, the spacing of said stops being such as to receive the reduced portion of the cylindrical member therebetween.

3. A sealing device comprising an elongated tubular member having an enlargement forming a shoulder at one end, the other end portion of said member being reduced in diameter to provide a shoulder substantially midway of said member, a plurality of longitudinally spaced internal shoulders provided in the axial bore of said member, a locking key provided with a shank receivable within said bore and carrying spring means for the selective engagement with any one of said internal shoulders to retain the key in place in secured engagement with said tubular member, a frangible head provided upon the outer end of said key and projecting laterally thereof, and a stop member formed with said head and extending upwardly therefrom in spaced parallel relationship with the shank of said key.

In testimony whereof we affix our signatures.

REINHARD L. HEEREN.
CHARLES W. STEVENS.